United States Patent
Matsuo et al.

(10) Patent No.: US 10,985,374 B2
(45) Date of Patent: Apr. 20, 2021

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, NON-AQUEOUS SECONDARY BATTERY ELECTRODE, AND NON-AQUEOUS SECONDARY BATTERY

(71) Applicant: ZEON CORPORATION, Chiyoda-ku Tokyo (JP)

(72) Inventors: Yusaku Matsuo, Tokyo (JP); Masanori Shibuya, Tokyo (JP); Kenya Sonobe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 78 days.

(21) Appl. No.: 16/081,135

(22) PCT Filed: Mar. 2, 2017

(86) PCT No.: PCT/JP2017/008352
§ 371 (c)(1),
(2) Date: Aug. 30, 2018

(87) PCT Pub. No.: WO2017/163806
PCT Pub. Date: Sep. 28, 2017

(65) Prior Publication Data
US 2019/0006677 A1 Jan. 3, 2019

(30) Foreign Application Priority Data

Mar. 24, 2016 (JP) .............................. JP2016-059917

(51) Int. Cl.
*H01M 4/62* (2006.01)
*H01M 4/13* (2010.01)
*C08L 101/08* (2006.01)
*C08K 3/00* (2018.01)
*H01M 4/04* (2006.01)
*H01M 4/139* (2010.01)
*C08F 220/56* (2006.01)
*H01M 10/0525* (2010.01)

(52) U.S. Cl.
CPC ............ *H01M 4/622* (2013.01); *C08F 220/56* (2013.01); *C08K 3/00* (2013.01); *C08L 101/08* (2013.01); *H01M 4/0404* (2013.01); *H01M 4/13* (2013.01); *H01M 4/139* (2013.01); *C08F 2800/20* (2013.01); *H01M 10/0525* (2013.01)

(58) Field of Classification Search
CPC .............. H01M 4/622; H01M 10/052; H01M 2300/0025; H01M 4/0404; H01M 4/139; H01M 4/13; H01M 10/0525; C08L 101/08; C08L 33/26; C08L 101/025; C08L 101/06; C08K 3/00; C08F 220/56; C08F 2800/20
See application file for complete search history.

(56) References Cited

U.S. PATENT DOCUMENTS

2004/0092652 A1    5/2004    Takata et al.

FOREIGN PATENT DOCUMENTS

| EP | 3154113 A1 | 4/2017 |
|---|---|---|
| JP | 2005060208 A | 3/2005 |
| JP | 2015022956 A | 2/2015 |
| JP | 2016031911 A | 3/2016 |
| WO | 2015186363 A1 | 12/2015 |

OTHER PUBLICATIONS

Machine translation of JP 2015-022956, retrieved from <www.espacenet.com> on Jun. 26, 2020.*
Sep. 25, 2018, International Preliminary Report on Patentability issued in the International Patent Application No. PCT/JP2017/008352.
Apr. 4, 2017, International Search Report issued in the International Patent Application No. PCT/JP2017/008352.
Jun. 25, 2020, Communication pursuant to Rule 114(2) EPC issued by the European Patent Office in the corresponding European Patent Application No. 17769851.1.
Jul. 8, 2019, the Extended European Search Report issued by the European Patent Office in the corresponding European Patent Application No. 17769851.1.

* cited by examiner

*Primary Examiner* — Cynthia K Walls
(74) *Attorney, Agent, or Firm* — Kenja IP Law PC

(57) ABSTRACT

Disclosed is a binder composition for non-aqueous secondary battery electrode which comprises: a water-soluble polymer which comprises an acid group-containing monomer unit; and water, wherein the water-soluble polymer comprises the acid group-containing monomer unit in an amount of 5% to 70% by mass, and wherein the water-soluble polymer comprises water-soluble polymer particles having a radius of gyration of 200 nm or less in an amount of 95% to 100% by mass.

7 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE, NON-AQUEOUS SECONDARY BATTERY ELECTRODE, AND NON-AQUEOUS SECONDARY BATTERY

TECHNICAL FIELD

The present disclosure relates to binder compositions for non-aqueous secondary battery electrodes, slurry compositions for non-aqueous secondary battery electrodes, non-aqueous secondary battery electrodes, and non-aqueous secondary battery.

BACKGROUND

Non-aqueous secondary batteries (hereinafter may be simply referred to as "secondary batteries") such as lithium ion secondary batteries are small and light, high in energy density, and capable of repeated cycles of charge and discharge. For such characteristics, secondary batteries are used in a wide variety of applications.

Positive and negative electrodes of a secondary battery are typically formed by applying onto respective current collectors slurry compositions which comprise an electrode active material and a binder composition for binding the electrode active material, and drying the slurry compositions (see, e.g., PTL 1).

CITATION LIST

Patent Literature

PTL 1: JP2016031911A

SUMMARY

Technical Problem

In recent years, in order to achieve higher performance of secondary batteries, there are increasing demands to improve battery characteristics such as low-temperature characteristics.

An object of the present disclosure is therefore to provide a binder composition for non-aqueous secondary battery electrode which can improve low-temperature characteristics of a non-aqueous secondary battery. Another object of the present disclosure is to provide a slurry composition for non-aqueous secondary battery electrode which can improve low-temperature characteristics of a non-aqueous secondary battery. Still another object of the present disclosure is to provide a non-aqueous secondary battery electrode which can improve low-temperature characteristics of a non-aqueous secondary battery. Yet another object of the present disclosure is to provide a non-aqueous secondary battery having good low-temperature characteristics.

Solution to Problem

A binder composition for non-aqueous secondary battery electrode according to the present disclosure comprises: a water-soluble polymer which comprises an acid group-containing monomer unit; and water, wherein the water-soluble polymer comprises the acid group-containing monomer unit in an amount of 5% to 70% by mass, and wherein the water-soluble polymer comprises water-soluble polymer particles having a radius of gyration of 200 nm or less in an amount of 95% to 100% by mass. With the binder composition having such a composition, it is possible to improve low-temperature characteristics of a non-aqueous secondary battery.

In the binder composition for non-aqueous secondary battery electrode according to the present disclosure, it is preferred that the water-soluble polymer has a weight-average molecular weight of 100,000 to 4,000,000. This improves cycle characteristics and suppresses electrode bulging.

In the binder composition for non-aqueous secondary battery electrode according to the present disclosure, it is preferred that the water-soluble polymer further comprises a (meth)acrylamide monomer unit in an amount of 30% to 85% by mass. This achieves reduction in resistance and improves cycle characteristics.

In the binder composition for non-aqueous secondary battery electrode according to the present disclosure, it is preferred that the water-soluble polymer further comprises a hydroxyl group-containing monomer unit, wherein the water-soluble polymer comprises the acid group-containing monomer unit in an amount of 5% to 65% by mass and comprises the hydroxyl group-containing monomer unit in an amount of 0.5% to 50% by mass. This achieves reduction in resistance and improves peel strength.

A slurry composition for non-aqueous secondary battery electrode according to the present disclosure comprises any one of the binder compositions described above for non-aqueous secondary battery electrode and an electrode active material. This improves low-temperature characteristics of a non-aqueous secondary battery.

A non-aqueous secondary battery electrode according to the present disclosure comprises an electrode substrate and an electrode mixed material layer disposed on the electrode substrate, wherein the electrode mixed material layer is formed using the slurry composition for non-aqueous secondary battery electrode described above. This improves low-temperature characteristics of a non-aqueous secondary battery.

A non-aqueous secondary battery according to the present disclosure comprises: a positive electrode; a negative electrode; a separator; and an electrolyte solution, wherein at least one of the positive electrode and the negative electrodes is the non-aqueous secondary battery electrode described above. With this configuration, the non-aqueous secondary battery shows good low-temperature characteristics.

Advantageous Effect

According to the present disclosure, it is possible to provide a binder composition for non-aqueous secondary battery electrode which can improve low-temperature characteristics of a non-aqueous secondary battery. According to the present disclosure, it is possible to provide a slurry composition for non-aqueous secondary battery electrode which can improve low-temperature characteristics of a non-aqueous secondary battery. According to the present disclosure, it is possible to provide a non-aqueous secondary battery electrode which can improve low-temperature characteristics of a non-aqueous secondary battery. According to the present disclosure, it is possible to provide a non-aqueous secondary battery having good low-temperature characteristics.

DETAILED DESCRIPTION

Embodiments of the present disclosure will be described below. The descriptions are illustrative purposes only and shall not to be construed to limit the scope of the present disclosure.

In the present disclosure, the radius of gyration of the water-soluble polymer is measured by the method described in Examples.

By "water-soluble" as used herein for a particular substance is meant that when 0.5 g of the substance is dissolved in 100 g of water at 25° C., the insoluble matter accounts for 0% to less than 1.0% by mass of the substance. By "water-insoluble" as used herein for a particular substance is meant that when 0.5 g of the substance is dissolved in 100 g of water at 25° C., the insoluble matter accounts for 90% to 100% by mass of the substance.

By "(meth)acrylamide" as used herein is meant one or more compounds selected from the group consisting of acrylamide, methacrylamide and a combination thereof.

By "acid group-containing monomer unit" as used herein is meant a structural unit formed by polymerization of a monomer having an acid group. By "(meth)acrylamide monomer unit" as used herein is meant a structural unit formed by polymerization of a (meth)acrylamide monomer. By "hydroxyl group-containing monomer unit" as used herein is meant a structural unit formed by polymerization of a monomer having a hydroxyl group.

Herein, in a polymer produced by copolymerization of more than one monomer, the proportion of a structural unit formed by polymerization of a monomer in that polymer is consistent with the proportion of the mass of that monomer (blending ratio) accounting for the mass of total monomers used for the polymerization of the polymer, unless otherwise indicated.

(Binder Composition for Non-Aqueous Secondary Battery Electrode)

A binder composition for non-aqueous secondary battery electrode according to the present disclosure comprises: a water-soluble polymer which comprises an acid group-containing monomer unit; and water, wherein the water-soluble polymer comprises the acid group-containing monomer unit in an amount of 5% to 70% by mass, and wherein the water-soluble polymer comprises water-soluble polymer particles having a radius of gyration of 200 nm or less in an amount of 95% to 100% by mass. With the binder composition having such a composition, it is possible to improve low-temperature characteristics of a non-aqueous secondary battery.

<Water-Soluble Polymer>

The water-soluble polymer has binding property and resistance to electrolyte solution and has a function of binding an electrode active material in a secondary battery. The water-soluble polymer comprises an acid group-containing monomer unit. The proportion of the acid group-containing monomer unit in the water-soluble polymer is 5% to 70% by mass. The water-soluble polymer comprises water-soluble polymer particles having a radius of gyration of 200 nm or less in an amount of 95% to 100% by mass.

The water-soluble polymer comprises at least an acid group-containing monomer unit. The water-soluble polymer may further comprise one or more monomer units selected from the group of, for example, a (meth)acrylamide monomer unit, a hydroxyl group-containing monomer unit, a cross-linkable monomer unit, a (meth)acrylic acid alkyl ester monomer unit, and an aromatic monovinyl monomer unit.

Examples of acid-containing monomers which may form the acid group-containing monomer unit include carboxyl group-containing monomers, sulfo group-containing monomers, and phosphate group-containing monomers. These acid-containing monomers may be used alone or in combination.

Examples of carboxyl group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methylvinyl sulfonic acid, (meth)allyl sulfonic acid, (meth)acrylic acid 2-sulfoethyl, 2-acrylamide-2-methyl propane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

The proportion of the acid group-containing monomer unit in the water-soluble polymer is 5% to 70% by mass and may be 7% by mass or more or 15% by mass or more, 40% by mass or less, 35% by mass or less or 25% by mass or less, preferably 5% to 65% by mass, more preferably 8% to 50% by mass, and even more preferably 10% to 30% by mass. Proportions of 5% by mass or more increases the coatability on the electrode active material and reduces side reactions to improve cycle characteristics. Proportions of 70% by mass or less increases the dispersion stability of the slurry, so that solid settling in the slurry does not occur and thereby resistance reduction (suppression of Li precipitation or improvement in low-temperature characteristics) can be achieved.

When the water-soluble polymer comprises a (meth)acrylamide monomer unit in addition to the acid group-containing monomer unit, the mass ratio of the acid group-containing monomer unit to the (meth)acrylamide monomer unit (i.e., the value obtained by dividing the mass of the acid group-containing monomer unit by the mass of the (meth)acrylamide monomer unit) is preferably 0.05 to 1.00, more preferably 0.085 to 0.8, and even more preferably 0.1 to 0.6. When the ratio is less than 0.05, the water-soluble polymer particles has a small radius of gyration, so that the spread of water-soluble polymer particles in the slurry is small and the stability of the slurry decreases. When the ratio is greater than 1.00, the water-soluble polymer has a large radius of gyration and its coatibility decreases.

Examples of (meth)acrylamide monomers which may form the (meth)acrylamide monomer unit include acrylamide and methacrylamide. These (meth)acrylamide monomers may be used alone or in combination.

The proportion of the (meth)acrylamide monomer unit in the water-soluble polymer may be adjusted as appropriate. For example, the proportion is preferably 30% to 85% by mass, more preferably 35% to 80% by mass, and even more preferably 40% to 75% by mass. Proportions of 30% by mass or more improves the dispersion stability of the slurry, so that solid settling in the slurry does not occur and thereby resistance reduction (suppression of Li precipitation or improvement in low-temperature characteristics) can be achieved. Proportions of 85% by mass or less increases the coatability on the electrode active material and reduces side reactions to improve cycle characteristics.

Examples of hydroxyl group-containing monomers which may form the hydroxyl group-containing monomer unit include hydroxyethyl acrylamide, hydroxyethyl methacrylamide, 2-hydroxyethyl acrylate, 2-hydroxypropyl acrylate, 2-hydroxyethyl methacrylate, and 2-hydroxypropyl methacrylate. These hydroxyl group-containing monomers may be used alone or in combination.

The proportion of the hydroxyl group-containing monomer unit in the water-soluble polymer may be adjusted as appropriate. For example, the proportion is preferably 0.5% to 50% by mass, more preferably 5% to 40% by mass, and even more preferably 10% to 30% by mass. Proportions of 0.5% by mass or more allows hydroxyl groups to be adsorbed to the electrode active material to increase peel strength. Proportions of 50% by mass or less suppresses the formation of a non-dissolved gel having a radius of gyration of greater than 200 nm, so that resistance reduction can be achieved.

Examples of cross-linkable monomers which may form the cross-linkable monomer unit include multi-functional monomers having two or more polymerizable groups in the monomer. Examples of such multi-functional monomers include, but not particularly limited to, divinyl compounds such as divinyl benzene; multi-functional (meth)acrylate compounds such as ethylene dimethacrylate, diethylene glycol dimethacrylate, ethylene glycol dimethacrylate, diethylene glycol diacrylate, 1,3-butylene glycol diacrylate, trimethylol propane trimethacrylate, trimethylol propane triacrylate, and ethoxylated pentaerythritol tetraacrylate; and epoxy group-containing ethylenically unsaturated monomers such as allyl glycidyl ether and glycidyl methacrylate. These cross-linkable monomers may be used alone or in combination.

The proportion of the cross-linkable monomer unit in the water-soluble polymer may be adjusted as appropriate. For example, the proportion is preferably 0.01% to 5% by mass, more preferably 0.1% to 4% by mass, and even more preferably 0.5% to 3% by mass. Proportions of 0.01% by mass or more suppresses elution of the water-soluble polymer into electrolyte solution. Proportions of 5% by mass or less ensures that the water-soluble polymer has sufficient adhesion.

The radius of gyration of the water-soluble polymer represents the radius of a water-soluble polymer particle in water. In the present disclosure, the proportion of water-soluble polymer particles having a radius of gyration of 200 nm or less in the water-soluble polymer is 95% to 100% by mass. While not wishing to be bound by theory, it is considered that a water-soluble polymer particle with a radius of gyration of greater than 200 nm is in the form of non-dissolved gel, and that water-soluble polymer particles are more evenly distributed in the electrode with a lesser amount of such non-dissolved gel and thereby resistance reduction can be achieved. The proportion of water-soluble polymer particles having a radius of gyration of 200 nm or less is preferably 99% to 100% by mass, and more preferably 99.5% to 100% by mass.

As described above, the radius of gyration of water-soluble polymer particles present in an amount of 95% to 100% by mass is 200 nm or less. It is preferred that the radius of gyration is 10 nm to 200 nm, and more preferably 30 nm to 180 nm.

The radius of gyration of the water-soluble polymer can be adjusted for example by changing by the above-described mass ratio of the acid group-containing monomer unit to the (meth)acrylamide monomer unit in the water-soluble polymer; the weight-average molecular weight of the water-soluble polymer; and/or the polymerization temperature during polymerization reaction, the type of a polymerization initiator, and the type of a polymerization accelerator, which will be described later.

The water-soluble polymer can have any molecular weight which can be adjusted as appropriate. For example, it is preferred that the weight-average molecular weight (Mw) is 100,000 to 4,000,000, more preferably 500,000 to 3,800,000, and even more preferably 1,500,000 to 3,500,000. When the Mw is 100,000 or more, the electrode strength increases, thereby improving cycle characteristics and suppressing electrode bulging. On the other hand, when the molecular weight is too high, coatability is lowered. Thus, Mw of 4,000,000 or less increases the coatability on the electrode active material and suppresses side reactions to thereby improve cycle characteristics.

The water-soluble polymer can be prepared in the manner described below, for example. Specifically, the acid group-containing monomer and other monomers described above are mixed. A polymerization accelerator is then added to the mixture followed by addition of a polymerization initiator to initiate a polymerization reaction. One or more cycles of: addition of a polymerization accelerator; addition of a polymerization initiator; and polymerization may then be carried out as needed. When a polymerization initiator is added to initiate a polymerization reaction, the polymerization temperature is preferably 35° C. to 65° C., and more preferably 40° C. to 50° C., for example. The polymerization temperature that falls within these ranges allows the radius of gyration of the water-soluble polymer to be reduced. The polymerization reaction time between the addition of the polymerization initiator and the addition of the polymerization accelerator is preferably, for example, from 10 minutes to 40 minutes, and more preferably from 15 minutes to 30 minutes. A polymerization time of 10 minutes or longer provides an effect of avoiding non-uniform mixing of the polymerization accelerator to suppress increases in radius of gyration due to the localized polymerization reaction. A polymerization time of 40 minutes or shorter suppresses side-reactions prior to addition of the polymerization initiator. After polymerization, the polymerization reaction is terminated by the addition of a reaction terminator. The resultant product is then cooled and placed under an air atmosphere. Next, the product is adjusted to pH 7.5 to 8.5 by the addition of aqueous lithium hydroxide solution, for example.

Any of the polymerization initiators known in the art can be used. Examples of polymerization initiators include potassium persulfate, sodium persulfate, and ammonium persulfate, with potassium persulfate being preferred. When the polymerization initiator is added multiple times, the polymerization initiator for each addition may be the same or different.

The amount of the polymerization initiator may be adjusted as appropriate. The amount is preferably 0.1 parts to 1.5 parts by mass in terms of solid content, for example.

Examples of polymerization accelerators include L-ascorbic acid and sodium bisulfate. When the polymerization accelerator is added multiple times, the polymerization accelerator for each addition may be the same or different. In particular, it is preferred that L-ascorbic acid is present as a polymerization accelerator in the polymerization system at the start of the polymerization reaction. While not wishing to be bound by theory, it is assumed that the presence of L-ascorbic acid as a polymerization accelerator at the start of the polymerization reaction suppresses side reactions in the initial stage of the polymerization reaction, thereby suppressing increases in the radius of gyration.

The amount of the polymerization accelerator may be adjusted as appropriate. The amount is preferably 0.01 parts to 0.3 parts by mass in terms of solid content, for example.

The blend amounts of the water-soluble polymer and water in the binder composition for non-aqueous secondary battery electrode are not particularly limited and can be adjusted as appropriate. For example, it is preferred that the water-soluble polymer and water are blended such that the binder composition has a solid concentration of 3% to 20% by mass, and more preferably 5% to 15% by mass.

<Other Components of Binder Composition for Non-Aqueous Secondary Battery Electrode>

The binder composition for non-aqueous secondary battery electrode may comprise other component(s) known for binder compositions. Examples include wetting agents, leveling agents, electrolyte solution decomposition inhibitors.

<Method of Preparing Binder Composition for Non-Aqueous Secondary Battery Electrode>

Methods of preparing binder compositions for non-aqueous secondary battery electrode are not particularly limited. For example, binder compositions can be prepared by dissolving or dispersing the water-soluble polymer and other optional components in water. Specifically, a dispersing machine such as a ball mill, a sand mill, a pigment disperser, a grinding machine, an ultrasonic disperser, a homogenizer, a planetary mixer, a bead mill, a roll mill or FILMIX is used to disperse or dissolve into water the water-soluble polymer and other optional components to prepare a binder composition for non-aqueous secondary battery electrode.

(Slurry Composition for Non-Aqueous Secondary Battery Electrode)

A slurry composition for non-aqueous secondary battery electrode according to the present disclosure comprises any one of the binder compositions described above for non-aqueous secondary battery electrode and an electrode active material. This improves low-temperature characteristics of a non-aqueous secondary battery.

Any of the electrode active materials for non-aqueous secondary batteries known in the art can be used. Because slurry compositions for non-aqueous secondary battery electrode according to the present disclosure are typically used in lithium ion secondary batteries, electrode active materials for lithium ion secondary batteries will be described below by way of example.

Electrode active materials for lithium ion secondary batteries may be any material as long as it can reversibly intercalate and release lithium ions by applying an electric potential in the electrolyte. Both inorganic and organic compounds can be used for such electrode active materials.

Positive electrode active materials are roughly classified into inorganic and organic compounds. Examples of positive electrode active materials composed of inorganic compounds include transition metal oxides, composite oxides of lithium and transition metals, and transition metal sulfides. Examples of transition metals include Fe, Co, Ni, and Mn. Specific examples of inorganic compounds used for positive electrode active materials include lithium-containing composite metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O-P_2O_5$, $MoO_3$, $V_2O_5$, and $V_6O_{13}$.

Examples of positive electrode active materials composed of organic compounds include electrically conductive polymers such as polyacetylene and poly-p-phenylene. Also usable are such positive electrode active materials composed of composite materials made of inorganic compounds combined with organic compounds.

These positive electrode active materials may be used alone or in combination.

Examples of negative electrode active materials include carbonaceous materials such as amorphous carbon, graphite, natural graphite, mesocarbon microbeads, and pitch carbon fibers; and electrically conductive polymers such as polyacene. Also included are metals such as silicon, tin, zinc, manganese, iron and nickel, and alloys thereof; oxides of the foregoing metals or alloys; and sulfates of the foregoing metals or alloys. Also usable are lithium; lithium alloys such as Li—Al, Li—Bi—Cd, and Li—Sn—Cd; lithium transition metal nitrides; and silicon. These negative electrode active materials may be used alone or in combination.

<Other Components of Slurry Composition for Non-Aqueous Secondary Battery Electrode>

The slurry composition for non-aqueous secondary battery electrode may comprise other component(s) known for slurry compositions. Examples include electrically conductive materials (conductive additives) and reinforcing materials.

Examples of electrically conductive materials (conductive additives) include electrically conductive carbon such as acetylene black, Ketjen black, carbon black, graphite, vapor-grown carbon fibers, and carbon nanotubes; carbon powders such as graphite; and fibers and foils of various metals. The use of electrically conductive materials increases electrical contact between electrode active materials, as well as improves output characteristics particularly when used in a lithium ion secondary battery.

Usable as reinforcing materials are, for example, various inorganic and organic spherical, plate-shaped, rod-shaped or fibrous fillers.

The solid concentration of the slurry composition for non-aqueous secondary battery electrode may be set as appropriate such that the slurry composition has a viscosity that does not compromise its workability when producing an electrode mixed material layer. Specifically, the solid concentration of the slurry composition for non-aqueous secondary battery electrode can be 40% to 55% by mass, for example.

<Method of Preparing Slurry Composition for Non-Aqueous Secondary Battery Electrode>

Any method can be used to prepare the slurry composition for non-aqueous secondary battery electrode. For example, the above-described method of preparing a binder composition can be used.

(Non-Aqueous Secondary Battery Electrode)

A non-aqueous secondary battery electrode according to the present disclosure comprises an electrode substrate and an electrode mixed material layer disposed on the electrode substrate, wherein the electrode mixed material layer is formed using the slurry composition for non-aqueous secondary battery electrode described above. This improves low-temperature characteristics of a non-aqueous secondary battery.

As the electrode substrate, any of the current collectors known in the art can be used, such as, for example, those made of metal material such as iron, copper, aluminum, nickel, stainless steel, titanium, tantalum, gold or platinum.

As electrode materials for the positive electrode, preferred are current collectors made of aluminum.

As electrode materials for the negative electrode, preferred are current collectors made of copper.

The electrode mixed material layer is a layer formed from the slurry composition for non-aqueous secondary battery electrode. The electrode mixed material layer can be formed by techniques known in the art. For example, the electrode mixed material layer can be formed by applying the prepared slurry composition on one or both sides of a current collector, drying the slurry composition, and heating the slurry composition at 120° C. or above for 1 hour or more. It is preferred the electrode mixed material layer is optionally subjected to pressing treatment such as mold pressing or roll pressing.

The electrode may also comprise components other than the electrode substrate and electrode mixed material layer without departing from the scope and spirit of the present disclosure. For example, where necessary, the electrode may comprise other layer(s) such as a protection layer disposed on the surface of the electrode mixed material layer.

(Non-Aqueous Secondary Battery)

A non-aqueous secondary battery according to the present disclosure comprises a positive electrode, a negative electrode, a separator, and an electrolyte solution, wherein at least one of the positive electrode and the negative electrodes is the non-aqueous secondary battery electrode described above. With this configuration, the non-aqueous secondary battery shows good low-temperature characteristics.

The positive and negative electrodes are non-aqueous secondary battery electrodes that comprise an electrode substrate for positive and/or negative electrode as described above and an electrode mixed material layer disposed on the electrode substrate, wherein the electrode mixed material layer is formed using the slurry composition for non-aqueous secondary battery electrode.

The separator can be any separator known in the art. Examples of usable separators include microporous membranes, porous membranes and nonwoven fabrics which comprise polyolefin resin such as polyethylene, polypropylene, polybutene or polyvinyl chloride, or aromatic polyamide resin; porous resin coats which comprise inorganic ceramic powder; microporous membranes made of resin such as polyethylene terephthalate, polycycloolefin, polyether sulfone, polyamide, polyimide, polyimideamide, polyaramide, nylon or polytetrafluoroethylene or woven fibers of polyolefin, or nonwoven fabrics thereof; aggregates of insulating material particles; and combinations thereof.

The electrolyte solution can be any electrolyte solution which can be selected as appropriate from those known in the art. Typically used is an organic electrolyte solution obtained by dissolving a supporting electrolyte into solvent (organic solvent). For example, when the non-aqueous secondary battery is a lithium ion secondary battery, a lithium salt is used as the supporting electrolyte. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferred in that they easily dissolve in solvent and exhibit a high degree of dissociation, with $LiPF_6$ being particularly preferred.

Electrolytes (supporting electrolytes) may be used alone or in combination.

The solvent used for the electrolyte solution can be any solvent which can dissolve supporting electrolytes and can be selected as appropriate from those known in the art. Examples of solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide.

In one example, the solvent is one or more carbonates selected from the group consisting of dimethyl carbonate, ethylene carbonate, diethyl carbonate, propylene carbonate, butylene carbonate, and ethyl methyl carbonate. In another example, the solvent is a mixed solution of EC and EMC. In yet another example, the solvent is a mixed solution of EC, EMC and DEC. The mixing ratio of solvents in the mixed solution may be adjusted as appropriate.

Any of additives known in the art, such as vinylene carbonate (VC), fluoroethylene carbonate (FEC) or ethyl methyl sulfone, may be added to the electrolyte solution.

The secondary battery can be of any shape which can be selected as appropriate. Examples include coin, button, sheet, cylindrical, square, and flattened shapes. A non-aqueous secondary battery according to the present disclosure is preferably of spirally wound or laminate type. This configuration provides an effect of increasing the energy density of the secondary battery.

<Method of Manufacturing Non-Aqueous Secondary Battery>

A method of manufacturing a non-aqueous secondary battery according to the present disclosure is not particularly limited except that the non-aqueous secondary battery electrode described above is used for at least one of positive and negative electrodes. Any method known in the art for manufacturing a non-aqueous secondary battery can be used.

For example, a non-aqueous secondary battery can be manufactured by stacking a positive electrode and a negative electrode with a separator provided therebetween, rolling or folding the resulting laminate as necessary in accordance with the battery shape, placing it in a battery container, filling the battery container with an electrolyte solution, and sealing the container. The non-aqueous secondary battery may also comprise, for example, an overcurrent preventing device such as a fuse or a PTC device; expanded metal; and/or a lead plate, where necessary.

EXAMPLES

The present disclosure will now be described in detail by way of Examples, which are illustration purposes only and shall not be construed to limit the scope of the present disclosure. Unless otherwise indicated, blend amounts are on a mass basis.

<Measurement of Radius of Gyration>

The radius of gyration of the water-soluble polymer was measured in the manner described below. The binder composition for non-aqueous secondary battery electrode can be separated by a Field-Flow Fractionation (hereinafter "FFF") device. The water-soluble polymer in the binder composition was analyzed for molecular weight and radius of gyration using an FFF device fitted with a multi angle light scattering (hereinafter "MALS") detector (hereinafter collectively "FFF-MALS"). The FFF device refers to a device capable of molecular weight fractionation by passing a sample solution through a gap (channel) of 100 μm to 500 μm size and by applying a field when the sample solution passes through the channel. After molecular weight fractionation, the absolute molecular weight was measured by the static light scattering method by MALS. As the FFF device, AF 2000 manufactured by Postnova was used. As the MALS detector, PN 3621 MALS manufactured by Postnova was used. As the RI detector, PI 3150 RI manufactured by Postnova was used. The channel was configured with a 10 kDa polyethersulfone membrane and 1 mM phosphate buffer was used as a developing solution. The sample was prepared by diluting 100 μL of the binder composition, diluted to 1% with ion-exchanged water, with 900 μL of 1 mM phosphate buffer (pH 7.4) to adjust the solid content to 0.1% by mass. 50 μL of the prepared sample was loaded into the FFF-MALS for measurement at a flow rate of 1.0 mL/min.

<Slurry Stability>

The slurry composition for non-aqueous secondary battery electrode prepared as described later was allowed to stand at room temperature. For the slurry composition, changes in viscosity over time were measured with a B type viscometer 24 hours immediately after preparation. The slurry stability was evaluated according to the following criteria, where A indicates the best slurry stability and D indicates the lowest slurry stability.

A: Viscosity change is less than 5.0%
B: Viscosity change is 5.0% to less than 10.0%
C: Viscosity change is 10.0% to less than 20.0%
D: Viscosity change is 20.0% or more <Peel Strength>

A negative electrode for lithium ion secondary battery manufactured as described below was cut into a rectangular piece measuring 100 mm in length and 10 mm in width to prepare a test specimen. A double-sided adhesive cellophane tape (specified in JIS Z1522) was attached to the surface of the negative electrode mixed material layer of the test specimen and the test specimen was affixed to a test stage with the surface of the negative electrode mixed material layer facing down. The stress at the time when one end of the current collector was pulled and peeled in the vertical direction at a pulling rate of 50 mm/min was measured. The measurement was made 3 times. An average of measured values was recorded as peel strength and evaluated based on the criteria below, where A indicates the best peel strength (adhesion between the negative electrode mixed layer and the current collector) and B indicates the lowest peel strength.

A: Peel strength is 15.0 N/m or more
B: Peel strength is 10.0 N/m to less than 15.0 N/m C: Peel strength is less than 10.0 N/m <Cycle Characteristics of Lithium Ion Secondary Battery>

A lithium ion secondary battery manufactured as described below was left to stand at 25° C. for 5 hours after electrolyte solution was injected. Next, the battery was charged to a cell voltage of 3.65V at a constant current of 0.2 C at 25° C. and then aged at 60° C. for 12 hours. The battery was then discharged to a cell voltage of 3.00V at a constant current of 0.2 C at 25° C. CC-CV (constant current-constant voltage) charging (upper limit cell voltage: 4.20V) was then carried out at a constant current of 0.2 C and CC discharging was carried out to a cell voltage of 3.00V at a constant current of 0.2 C to measure initial discharge capacity X1. 50 cycles of charging/discharging were carried out at a cell voltage of 4.20-3.00V at a charge/discharge rate of 1.0 C in an environment of 45° C. Subsequently, 50 cycles of charging/discharging were carried out at a cell voltage of 4.20-3.00V at a charge/discharge rate of 0.5 C in an environment of 0° C. Further subsequently, CC-CV charging (cell voltage: 4.20V) was carried out at a constant current of 0.2 C at 25° C. and discharging was carried out to a cell voltage of 3.00V at a constant current of 0.2 C to measure discharge capacity X2. Using the initial discharge capacity X1 and the discharge capacity X2, % capacity maintenance represented by $\Delta C'=(X2/X1)\times100(\%)$ was calculated and evaluated according to the following criteria, where A indicates the best cycle characteristics and D indicates the lowest cycle characteristics.

A: % Capacity maintenance $\Delta C'$ is 80% or more
B: % Capacity maintenance $\Delta C'$ is 75% to less than 80%
C: % Capacity maintenance $\Delta C'$ is 70% to less than 75% D: % Capacity maintenance $\Delta C'$ is less than 70%

<Low-Temperature Characteristics (Rate Characteristics)>

A lithium ion secondary battery manufactured as described below was left to stand at 25° C. for 5 hours after electrolyte solution was injected. Next, the battery was charged to a cell voltage of 3.65V at a constant current of 0.2 C at 25° C. and then aged at 60° C. for 12 hours. The battery was then discharged to a cell voltage of 3.00V at a constant current of 0.2 C at 25° C. CC-CV (constant current-constant voltage) charging (upper limit cell voltage: 4.35V) was then carried out at a constant current of 0.2 C and CC discharging was carried out to a cell voltage of 3.00V at a constant current of 0.2 C. This charging/discharging at 0.2 C was repeated 3 times. Next, charging/discharging at a constant current of 0.5 C was carried out at a cell voltage of between 4.35-3.00V in an environment of 25° C. Discharge capacity at this point of time was defined as C0. Subsequently, CC-CV charging was similarly carried out at a constant current of 0.2 C and discharging was carried out to 2.5V at a constant current of 0.5 C in an environment of −20° C. Discharge capacity at this point of time was defined as C1. As rate characteristics, % capacity maintenance represented by $\Delta C=(C1/C0)\times100(\%)$ was calculated and evaluated based on the following criteria, where A indicates the best low-temperature characteristics (i.e., high discharge capacity and low internal resistance at high current in a low-temperature environment) and D indicates the lowest low-temperature characteristics.

A: % Capacity maintenance $\Delta C$ is 75% or more
B: % Capacity maintenance $\Delta C$ is 70% to less than 75%
C: % Capacity maintenance $\Delta C$ is 65% to less than 70%
D: % Capacity maintenance $\Delta C$ is less than 65%

<Resistance to Electrode Bulging after Cycles>

The cell subjected to the 50 cycles was charged at 1 C in an environment of 25° C., the charged cell was disassembled, the negative electrode was taken out, and the thickness (d2) of the negative electrode (excluding the thickness of the current collector) was measured. % Change in the thickness of the negative electrode (excluding the thickness of the current collector) after the cycles with respect to the thickness (d0) of the negative electrode (excluding the thickness of the current collector) before the cycles (before manufacture of the lithium ion secondary battery) (% change=$[(d2-d0)/d0]\times100(\%)$) was calculated and evaluated based on the following criteria, where A indicates the best resistance to electrode bulging after the cycles and D indicates the lowest resistance to electrode bulging after the cycles.

A: % Change in thickness is less than 25%
B: % Change in thickness is 25% to less than 30%
C: % Change in thickness is 30% to less than 35%
D: % Change in thickness is 35% or more The components used in Examples are as follows:
Acid group-containing monomer: acrylic acid
(Meth)acrylamide monomer: acrylamide
Hydroxyl group-containing monomer: hydroxyethyl acrylamide Cross-linkable monomer: ethoxylated pentaerythritol tetraacrylate (product name ATM-35E, manufactured by Shin-Nakamura Chemical Co., Ltd.)

Comparative water-soluble polymer (carboxymethyl cellulose): CMC Daicel 2200 manufactured by Daicel Corporation Polymerization initiator: potassium persulfate Polymerization accelerator: L-ascorbic acid and sodium bisulfite Reaction terminator: sodium nitrite Acetylene black: HS-100 manufactured by Denka Company Ltd.

Example 1

<Preparation of Binder Composition for Non-Aqueous Secondary Battery Electrode>

842 parts by mass of ion-exchanged water was charged into a 10 L flask fitted with a septum, heated to a temperature of 40° C. and the flask was purged with nitrogen gas at a flow rate of 100 mL/min. Next, acrylamide, acrylic acid and hydroxyethyl acrylamide were mixed in amounts shown in Table 1 and injected into the flask with a syringe. Thereafter, 0.05 parts by mass, in terms of solid content, of 2.0% aqueous solution of L-ascorbic acid was added to the flask with a syringe. 15 minutes later, using 2.0% aqueous solution of potassium persulfate, potassium persulfate was added to the flask with a syringe in an amount in terms of solid content as shown in Table 1 to initiate a reaction, and the reaction temperature was raised to 55° C. After 2 hours, in order to further increase the reaction conversion rate, 0.2 parts by mass, in terms of solid content, of 2.0% aqueous solution of potassium persulfate and 0.077 parts by mass, in terms of solid content, of sodium bisulfite were added. After 2 hours, 0.2 parts by mass, in terms of solid content, of 2.0% aqueous solution of potassium persulfate and 0.077 parts by mass, in terms of solid content, of 1.0% aqueous solution of sodium bisulfite were added. After 2 hours, 0.1 parts by mass, in terms of solid content, of 10% sodium nitrite aqueous solution was added to the flask and stirred. The flask was then cooled to 40° C. and purged with air. The binder composition containing a water-soluble polymer and water was adjusted to pH 8.0 with 5% lithium hydroxide aqueous solution.

Examples 2 to 15 and Comparative Examples 1 to 3

Water-soluble polymers were synthesized to prepare binder compositions for non-aqueous secondary battery electrodes as in Example 1 except that the monomers and the polymerization initiator to initiate the reaction were changed as shown in Table 1. In Example 15, the above-mentioned cross-linkable monomer ATM-35E was used as an additional monomer.

Comparative Examples 4 and 5

Comparative water-soluble polymers were synthesized to prepare binder compositions for non-aqueous secondary battery electrodes as in Example 1 except for the following points: The reaction temperature was changed to 70° C.; monomers were changed as shown in Table 1; in Comparative Example 4, 10 parts by mass of ethyl acrylate (EA) was used as an unsaturated carboxylic acid ester (additional monomer); the polymerization initiator was changed to sodium persulfate; L-ascorbic acid was not used; and two hours after the start of the reaction, the temperature was raised to 90° C. and the reaction was further carried out for 2 hours.

Comparative Example 6

A binder composition for non-aqueous secondary battery electrode was prepared as in Example 1 except that carboxymethyl cellulose (Daicel 2200) was used as a comparative water-soluble polymer instead of the water-soluble polymer.

<Preparation of Slurry Composition for Lithium Ion Secondary Battery Negative Electrode>

100 parts by mass of artificial graphite (theoretical capacity: 350 mAh/g) as a negative electrode active material, 1 part by mass of acetylene black as an electrically conductive material and 1.50 parts by mass, in terms of solid content, of the binder composition for non-aqueous secondary battery electrode (solid concentration: 5.0%) prepared were charged into a planetary mixer. Further, the mixture was diluted with ion-exchanged water to a solid concentration of 60%. The mixture was then kneaded at a rotational speed of 45 rpm for 60 minutes. Ion exchanged water was added so that the mixture had a viscosity of 1,100±100 mPa·s (as measured with a B type viscometer at 12 rpm) to prepare a slurry composition for lithium ion secondary battery negative electrode. The solid concentration of the slurry composition at this point of time was 45% by mass. The prepared slurry composition was evaluated for slurry stability as described above.

<Preparation of Slurry Composition for Lithium Ion Secondary Battery Positive Electrode>

100 parts by mass of lithium cobalt oxide (theoretical capacity: 150 mAh/g) as a positive electrode active material, 3 parts by mass of acetylene black as an electrically conductive material and 4.00 parts by mass, in terms of solid content, of the binder composition for non-aqueous secondary battery electrode (solid concentration: 5.0%) were charged into a planetary mixer. Further, the mixture was diluted with ion-exchanged water to a solid concentration of 60%. The mixture was then kneaded at a rotational speed of 45 rpm for 60 minutes. Ion-exchanged water was added so that the mixture had a viscosity of 4,000±300 mPa·s (as measured with a B type viscometer at 60 rpm) to prepare a slurry composition for lithium ion secondary battery positive electrode. The solid concentration of the slurry composition at this point of time was 50% by mass.

<Preparation of Non-Aqueous Secondary Battery Negative Electrode>

The slurry composition for lithium ion secondary battery negative electrode prepared above was applied by a comma coater onto a 15 μm-thick copper foil (current collector) in a coating amount of 10 mg/cm² to 12 mg/cm² and dried. Drying was performed by transporting the copper foil coated with the slurry composition through an oven at 80° C. at a rate of 0.5 m/min over 2 minutes. The current collector was further heated for 2 minutes at 120° C. to afford a web of negative electrode. The web of negative electrode was pressed with a roll pressing machine to have a density of 1.60 to 1.75 g/cm³ to afford a negative electrode in which a negative electrode mixed material layer is formed on one side of the current collector. The negative electrode for lithium ion secondary battery thus prepared was evaluated for peel strength as described above.

<Preparation of Non-Aqueous Secondary Battery Positive Electrode>

The slurry composition for lithium ion secondary battery positive electrode prepared above was applied by a comma coater onto a 20 μm-thick aluminum foil (current collector) and dried. Drying was performed by transporting the aluminum foil coated with the slurry composition through an oven at 60° C. at a rate of 0.5 m/min over 2 minutes. The current collector was further heated for 2 minutes at 120° C. to afford a web of positive electrode. The web of positive electrode was pressed with a roll pressing machine to have a density of 3.10 to 3.20 g/cm$^3$ to afford a positive electrode in which a positive electrode mixed material layer is formed on one side of the current collector.

<Assembling of Non-Aqueous Secondary Battery>

A single-layered polypropylene separator (65 mm width, 500 mm length, 25 μm thick; manufactured by dry process; 55% porosity) was prepared and cut out into a 5 cm×5 cm square. As a battery outer package, an aluminum outer package was prepared. The prepared positive electrode was cut into a 4 cm×4 cm square and disposed so that the surface of the current collector of the positive electrode was in contact with the aluminum outer package. Next, the square separator was disposed on the surface of the positive electrode mixed material layer of the positive electrode. The prepared negative electrode was cut into a 4.2 cm×4.2 cm square and disposed on the surface of the separator which faces away from the positive electrode mixed layer such that the negative electrode mixed layer side faces the separator. 1.0M LiPF$_6$ solution (solvent: mixed solution of ethylene carbonate and ethyl methyl carbonate (3:7 by volume), additive: vinylene carbonate (2% by mass based on solvent)) was charged as electrolyte solution. Next, the aluminum outer package was subjected to heat sealing at 150° C. to tightly seal up the opening of the aluminum outer package. In this way a lithium ion secondary battery as a non-aqueous secondary battery was manufactured. The lithium ion secondary battery thus manufactured was then evaluated for cycle characteristics, low-temperature characteristics and resistance to electrode bulging after cycles as described above. The results are set forth in Table 1.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Water-soluble polymer (parts by mass) | Acid group-containing monomer unit | 15 | 15 | 15 | 15 | 15 | 25 | 25 | 25 |
| | (Meth)acrylamide monomer unit | 70 | 70 | 70 | 70 | 70 | 75 | 73.2 | 67 |
| | Hydroxyl group-containing monomer unit | 15 | 15 | 15 | 15 | 15 | — | 1.8 | 8 |
| | Acid group-containing monomer unit/(meth)acrylamide monomer unit ratio | 0.21 | 0.21 | 0.21 | 0.21 | 0.21 | 0.33 | 0.34 | 0.37 |
| | Other monomer units | — | — | — | — | — | — | — | — |
| | Weight-average molecular weight (×10$^3$) | 2,700 | 2,200 | 3,000 | 3,800 | 1,300 | 2,500 | 800 | 1,000 |
| | Proportion of water-soluble polymer particles with a radius of gyration of 200 nm or less (% by mass) | 100.0 | 99.4 | 99.2 | 99.0 | 100.0 | 99.8 | 100.0 | 99.9 |
| Polymerization initiator | Type | Potassium persulfate | Potassium persulfate | Potassium persulfate | Potassium persulfate | Potassium persulfate | Potassium persulfate | Potassium persulfate | Potassium persulfate |
| | Amount (parts by mass) | 0.23 | 0.26 | 0.20 | 0.15 | 0.30 | 0.23 | 0.50 | 0.50 |
| | Start polymerization temperature (° C.) | 40 | 40 | 40 | 40 | 40 | 40 | 40 | 40 |
| Other | | — | — | — | — | — | — | — | — |
| Evaluation items | Slurry stability | A | A | A | A | A | A | B | B |
| | Peel strength | A | A | A | A | B | B | B | B |
| | Cycle characteristics | A | A | A | B | B | A | B | B |
| | Low-temperature characteristics | A | B | B | B | A | A | B | B |
| | Resistance to electrode bulging | A | A | A | A | B | A | B | B |

| | | Ex. 9 | Ex. 10 | Ex. 11 | Ex. 12 | Ex. 13 | Ex. 14 | Ex. 15 |
|---|---|---|---|---|---|---|---|---|
| Water-soluble polymer (parts by mass) | Acid group-containing monomer unit | 25 | 7 | 40 | 35 | 25 | 25 | 25 |
| | (Meth)acrylamide monomer unit | 53 | 78 | 45 | 50 | 75 | 75 | 74.5 |
| | Hydroxyl group-containing monomer unit | 22 | 15 | 15 | 15 | — | — | — |
| | Acid group-containing monomer unit/(meth)acrylamide monomer unit ratio | 0.47 | 0.09 | 0.89 | 0.7 | 0.33 | 0.33 | 0.34 |
| | Other monomer units | — | — | — | — | — | — | 0.5 |
| | Weight-average molecular weight (×10$^3$) | 900 | 2,200 | 2,000 | 1,800 | 500 | 4,000 | 800 |
| | Proportion of water-soluble polymer particles with a radius of gyration of 200 nm or less (% by mass) | 99.5 | 99.8 | 99.0 | 99.0 | 100.0 | 99.0 | 99.5 |

TABLE 1-continued

| Polymer-ization initiator | Type | Potassium persulfate | Potassium persulfate | Potassium persulfate | Potassium persulfate | Potassium persulfate | Potassium persulfate | Potassium persulfate |
|---|---|---|---|---|---|---|---|---|
| | Amount (parts by mass) | 1.50 | 0.23 | 0.23 | 0.23 | 0.60 | 0.15 | 0.29 |
| | Start polymerization temperature (° C.) | 40 | 40 | 40 | 40 | 40 | 40 | 40 |
| Other | | — | — | — | — | — | — | — |
| Evaluation items | Slurry stability | B | B | B | B | B | B | A |
| | Peel strength | A | B | B | B | C | B | B |
| | Cycle characteristics | B | B | B | B | B | B | A |
| | Low-temperature characteristics | B | B | B | B | B | B | A |
| | Resistance to electrode bulging | B | A | A | A | B | B | A |

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Water-soluble polymer (parts by mass) | Acid group-containing monomer unit | 100 | — | 2 | 10 | 15 | CMC |
| | (Meth)acrylamide monomer unit | — | 100 | 98 | 80 | 70 | |
| | Hydroxyl group-containing monomer unit | — | — | — | — | 15 | |
| | Acid group-containing monomer unit/(meth)acrylamide monomer unit ratio | — | — | 0.02 | 0.13 | 0.21 | — |
| | Other monomer units | — | — | — | 10 | — | — |
| | Weight-average molecular weight (×10³) | 2,000 | 950 | 2,300 | 4,500 | 5,000 | 5,200 |
| | Proportion of water-soluble polymer particles with a radius of gyration of 200 nm or less (% by mass) | 98.0 | 99.0 | 99.0 | 90.0 | 91.0 | 80.0 |
| Polymer-ization initiator | Type | Potassium persulfate | Potassium persulfate | Potassium persulfate | Sodium persulfate | Sodium persulfate | — |
| | Amount (parts by mass) | 0.23 | 0.23 | 0.23 | 0.30 | 0.30 | — |
| | Start polymerization temperature (° C.) | 40 | 40 | 40 | 70 | 70 | — |
| Other | | — | — | — | No L-ascorbic acid used | No L-ascorbic acid used | — |
| Evaluation items | Slurry stability | D | D | C | D | D | C |
| | Peel strength | C | D | C | D | D | C |
| | Cycle characteristics | D | D | C | D | D | D |
| | Low-temperature characteristics | D | D | C | D | D | D |
| | Resistance to electrode bulging | C | D | C | D | D | D |

As shown in Table 1, Comparative Examples 1 to 3 where the proportion of the acid group-containing monomer unit falls outside the predetermined range showed inferior low-temperature characteristics and other performance. Comparative Examples 4 and 5 where the proportion of water-soluble polymer particles with a radius of gyration of 200 nm or less is less than 95% by mass also showed inferior low-temperature characteristics and other performance. Comparative Example 6 where the comparative water-soluble polymer was used also showed inferior low-temperature characteristics and other performance.

In contrast, Examples showed good low-temperature characteristics. As demonstrated in Examples 1 to 3, Example 1 where the proportion of water-soluble polymer particles with a radius of gyration of 200 nm or less is highest showed superior low-temperature characteristics compared to Examples 2 and 3. Similarly, comparing Examples 1 and 4, Example 1 showed superior low-temperature characteristics compared to Example 4 due to a higher proportion of water-soluble polymer particles with a radius of gyration of 200 nm or less. Further, Example 1 showed better coatability on the active material as well as superior cycle characteristics compared to Example 4 due to a lower weight-average molecular weight of the water-soluble polymer. Comparing Examples 1 and 5, Example 1 showed better peel strength compared to Example 5 due to a higher weight-average molecular weight of the water-soluble polymer and improved electrode strength due to better peel strength resulted in better cycle characteristics and resistance to electrode bulging compared to Example 5. Comparing Examples 1 and 6, Example 1 showed superior peel strength compared to Example 6 because the water-soluble polymer of Example 1 comprises a hydroxyl group-containing monomer unit which is not present in the water-soluble polymer of Example 6. Similarly, comparing Example 1 and Examples 7 and 8, Example 1 showed superior peel strength compared to Examples 7 and 8 due to a higher proportion of the hydroxyl group-containing monomer unit. Further, Example 1 showed superior slurry stability and cycle characteristics compared to Examples 7 and 8 due to a higher weight-average molecular weight of the water-soluble polymer. Comparing Examples 8 and 9, Example 9 showed better peel strength compared to Example 8 due to a higher proportion of the hydroxyl group-containing monomer unit. Comparing Examples 1, 11 and 12, Example 1 showed better low-temperature characteristics compared to Examples 11 and 12 due to a smaller ratio of acid group-containing monomer unit/(meth)acrylamide monomer unit and therefore a higher proportion of water-soluble polymer particles with a radius of gyration of 200 nm or less. Comparing Examples 6 and 13, Example 6 showed better various characteristics compared to Example 13 due to a higher weight-average molecular weight of the water-soluble polymer. Comparing Examples 6 and 14, Example 6 showed better coatability on the active material and superior cycle characteristics compared to Example 14 due to a lower weight-average molecular weight of the water-soluble polymer.

INDUSTRIAL APPLICABILITY

According to the present disclosure, it is possible to provide a binder composition for non-aqueous secondary battery electrode which can improve low-temperature characteristics of a non-aqueous secondary battery. According to the present disclosure, it is possible to provide a slurry composition for non-aqueous secondary battery electrode which can improve low-temperature characteristics of a non-aqueous secondary battery. According to the present disclosure, it is possible to provide a non-aqueous secondary battery electrode which can improve low-temperature characteristics of a non-aqueous secondary battery. According to the present disclosure, it is possible to provide a non-aqueous secondary battery having good low-temperature characteristics.

The invention claimed is:

1. A binder composition for non-aqueous secondary battery electrode comprising: a water-soluble polymer which comprises an acid group-containing monomer unit; and water,
    wherein the water-soluble polymer comprises the acid group-containing monomer unit in an amount of 5% to 70% by mass,
    wherein the water-soluble polymer comprises water-soluble polymer particles having a radius of gyration of 200 nm or less in an amount of 95% to 100% by mass,
    wherein the water-soluble polymer further comprises a (meth)acrylamide monomer unit in an amount of 30% to 85% by mass, and
    wherein a mass ratio of the acid group-containing monomer unit to the (meth)acrylamide monomer unit in the water-soluble polymer is 0.05 to 1.00.

2. The binder composition for non-aqueous secondary battery electrode according to claim 1, wherein the water-soluble polymer has a weight-average molecular weight of 100,000 to 4,000,000.

3. The binder composition for non-aqueous secondary battery electrode according to claim 1, wherein the water-soluble polymer further comprises a hydroxyl group-containing monomer unit, and
    wherein the water-soluble polymer comprises the acid group-containing monomer unit in an amount of 5% to 65% by mass and comprises the hydroxyl group-containing monomer unit in an amount of 0.5% to 50% by mass.

4. A slurry composition for non-aqueous secondary battery electrode comprising: the binder composition for non-aqueous secondary battery electrode according to claim 1; and an electrode active material.

5. A non-aqueous secondary battery electrode comprising: an electrode substrate; and an electrode mixed material layer disposed on the electrode substrate,
    wherein the electrode mixed material layer is formed using the slurry composition for non-aqueous secondary battery electrode according to claim 4.

6. A non-aqueous secondary battery comprising: a positive electrode; a negative electrode; a separator; and an electrolyte solution,
    wherein at least one of the positive electrode and the negative electrodes is the non-aqueous secondary battery electrode according to claim 5.

7. The binder composition for non-aqueous secondary battery electrode according to claim 1, wherein the water-soluble polymer has a weight-average molecular weight of 500,000 to 4,000,000, and
    wherein a mass ratio of the acid group-containing monomer unit to the (meth)acrylamide monomer unit in the water-soluble polymer is 0.09 to 0.89.

* * * * *